(12) United States Patent
Foster et al.

(10) Patent No.: US 7,153,395 B2
(45) Date of Patent: *Dec. 26, 2006

(54) SYSTEMS AND METHODS FOR SOLAR DISTILLATION

(75) Inventors: Robert E. Foster, Mesilla Park, NM (US); Michael J. Cormier, Chaparral, NM (US); Gregory R. Vogel, Las Cruces, NM (US); William H. Amos, Chaparral, NM (US)

(73) Assignee: SolAqua, Inc., El Paso, TX (US)

( * ) Notice: Subject to any disclaimer, the term of this patent is extended or adjusted under 35 U.S.C. 154(b) by 706 days.

This patent is subject to a terminal disclaimer.

(21) Appl. No.: 10/125,438

(22) Filed: Apr. 19, 2002

(65) Prior Publication Data

US 2002/0162733 A1    Nov. 7, 2002

Related U.S. Application Data

(63) Continuation-in-part of application No. 09/845,359, filed on May 1, 2001, now Pat. No. 6,767,433.

(51) Int. Cl.
 *B01D 3/00* (2006.01)
(52) U.S. Cl. ............. 202/234; 159/903; 159/DIG. 15; 202/267.1; 203/10; 203/86; 203/DIG. 1
(58) Field of Classification Search ............... 202/234, 202/267.1; 203/DIG. 1, 10, 86; 159/903, 159/DIG. 15
See application file for complete search history.

(56) References Cited

U.S. PATENT DOCUMENTS

| | | | |
|---|---|---|---|
| 3,655,517 A * | 4/1972 | Hensley et al. ............. | 202/234 |
| 3,930,958 A | 1/1976 | Maruichi ..................... | 202/174 |
| 4,010,080 A | 3/1977 | Tsay et al. ..................... | 202/83 |
| 4,055,473 A | 10/1977 | Hay ............................ | 202/234 |
| 4,077,849 A | 3/1978 | Ziehm, Jr. .................. | 202/205 |
| 4,135,985 A | 1/1979 | La Rocca .................... | 202/176 |

(Continued)

FOREIGN PATENT DOCUMENTS

DE    3339898    11/1983

(Continued)

OTHER PUBLICATIONS

The Solar Water Purifier, Advetisement for Global Pure Water Pty Ltd., www.globalpurewater.com.au., Nov. 25, 2001.

(Continued)

*Primary Examiner*—N. Bhat
(74) *Attorney, Agent, or Firm*—Wolff Law Offices, PLLC; Kevin Alan Wolff

(57) ABSTRACT

The present invention is directed to an improved solar powered distillation system and method. The solar powered still may have a membrane that is extruded, molded, or sprayed-on. The membrane may be installed in a lightweight basin as a liner resulting in improved ease of still manufacturing and assembly as well as improved sealing. Further, the membrane may have a plurality of fluid reservoirs. In a preferred embodiment, the membrane material may be an opaque water grade non-toxic odorless, tasteless silicon, Uniprene, or Sarlink. In one variation, the solar still basin casing may be molded and made of ABS, polycarbonates, or polybutylene. The solar still may further include legs made of PVC or similar pipe materials and may include a strengthening member formed integrally in the bottom surface of the basin casing. The still may include a metal and rubber seal stripping to couple a sheet of glass to the still basing.

44 Claims, 16 Drawing Sheets

U.S. PATENT DOCUMENTS

| | | | |
|---|---|---|---|
| 4,137,901 A | 2/1979 | Maier | 126/271 |
| 4,138,293 A | 2/1979 | Ziehm, Jr. | 202/180 |
| 4,141,798 A | 2/1979 | Grosse | 202/234 |
| 4,172,767 A | 10/1979 | Sear | 202/182 |
| 4,227,970 A | 10/1980 | Howell, Jr. et al. | 202/234 |
| 4,235,679 A | 11/1980 | Swaidan | 202/234 |
| 4,267,021 A | 5/1981 | Speros et al. | 202/176 |
| 4,279,244 A | 7/1981 | McAlister | 126/621 |
| 4,329,205 A * | 5/1982 | Tsumura et al. | 202/174 |
| 4,420,375 A * | 12/1983 | Husson | 202/234 |
| 4,440,861 A | 4/1984 | McCarthy | 435/306 |
| 4,487,659 A | 12/1984 | Stark | 202/172 |
| 4,606,794 A | 8/1986 | Wyckoff | 202/173 |
| 4,620,900 A | 11/1986 | Kimura et al. | 202/172 |
| 4,756,802 A * | 7/1988 | Finney | 202/172 |
| 4,853,088 A | 8/1989 | Conway | 203/10 |
| 4,966,655 A | 10/1990 | Wilkerson, Jr. | 202/234 |
| 5,098,220 A | 3/1992 | Norman | 405/52 |
| 5,316,626 A | 5/1994 | Guy | 203/10 |
| 5,391,262 A * | 2/1995 | Wilkerson, Jr. | 203/10 |
| 5,468,351 A | 11/1995 | Hirota et al. | 202/234 |
| 5,598,661 A | 2/1997 | Eiderman et al. | 47/48.5 |
| 5,628,879 A * | 5/1997 | Woodruff | 202/234 |
| 5,650,050 A | 7/1997 | Kaufmann | 202/234 |
| 5,969,087 A | 10/1999 | Maeda | 528/353 |
| 6,001,222 A * | 12/1999 | Klein | 202/234 |
| 6,063,995 A | 5/2000 | Bohland et al. | 136/243 |
| 6,440,275 B1 * | 8/2002 | Domen | 202/234 |
| 6,767,433 B1 * | 7/2004 | Foster et al. | 202/234 |
| 6,797,124 B1 * | 9/2004 | Ludwig | 202/234 |

FOREIGN PATENT DOCUMENTS

| | | |
|---|---|---|
| DE | 2604978 | 3/1997 |
| WO | WO 9816474 A | 4/1998 |

OTHER PUBLICATIONS

Robert Foster and Mike Cormier, "Solar Still Construction and Operation," El Paso Solar Energy Association (El Paso, TX), (Summer 1999).

* cited by examiner

SYSTEMS AND METHODS FOR SOLAR DISTILLATION

CROSS REFERENCE TO RELATED APPLICATIONS

This application is a continuation-in-part of prior U.S. patent application Ser. No. 09/845,359 filed on May 1, 2001, now U.S. Pat. No. 6,767,433 which is hereby incorporated herein by reference for all purposes.

TECHNICAL FIELD

The invention relates generally to solar energy methods and systems, and particularly with systems and methods for solar energy distillation.

BACKGROUND OF THE INVENTION

Solar energy is a free renewable energy source that is readily available in many parts of the world. Given that solar energy is readily available to all for merely the cost of equipment to convert it to an intended purpose, solar energy may be particularly attractive for use in areas with populations that have limited financial resources. Technological developments have resulted in the use of solar energy for many applications, for example, thermal heating systems, electricity production systems, and solar distillation systems.

Solar distillation systems (also referred to herein as "solar distillers," "solar stills," "single basin or multiple effect stills," or simply "stills") have been in use since 1872. Some examples may be found with reference to various patents including: U.S. Pat. Nos. 5,628,879; 4,135,985; 4,141,798; 4,487,659; and 4,267,021. Unfortunately, many of these prior art still designs suffer from various deficiencies so that they do not provide a practical solution for providing clean and safe drinking water to the masses of people throughout the world who have limited knowledge about solar energy distillation systems and finances. For example, many of the known stills are difficult and/or expensive to construct or purchase. In fact, in some areas of the world proper and safe building materials for building stills are not available. Some stills are often difficult to construct, difficult to move, not durable, and/or difficult to maintain.

One particular application of solar distillation systems is water distillation. In many geographical locations of the world clean and safe potable drinking water is expensive and/or in scarce supply. Often the available water supply is salty, brackish, and/or contaminated with various undesirable and possibly toxic substances which results in water that may not be suitable for human and/or animal consumption. These geographical locations are often remote and might not have common utilities such as electricity and/or effective public water purification systems. Further, the people who inhabit these locations may not have enough money to be able to afford public water or continuous electric utility cost. As a result they often resort to purchasing bottle water for drinking and cooking purposes. However, a properly designed and operated solar still as provided by the present invention may be a preferred alternative to purchasing bottled water by providing many years of clean safe good tasting water production to these people. Such a solar still may be extremely effective in providing clean drinking water from a high dissolved salt and other mineral content water, effective at eliminating dangerous bacteria such as cholera, *E. coli*, etc, cost effective, easy to install, and easy to maintain. Although many solar still designs are not always capable of effectively removing volatile organic compounds (VOC) such as pesticides, or petroleum distillates.

In one type of solar still the still basin may be sealed with a variety of materials, including silicone, so as to retain the liquid solution to be distilled. The basin sealing materials are applied to a rigid basin structural material or insulation material as a coating of material in liquid form that dries and adheres to a rigid basin structural material so as to seal the basin for retaining, for example, water. For example, the solar still basin structural material may be a cement, concrete or wood material and one or more layers of silicone may be manually spread over the surface of the basin or an insulation lined basin to seal the basin structural material from the liquid (e.g., water) to be distilled. This sealing layer(s) may be referred to as the "membrane" or "diaphragm" of the still. However, manual application of the silicone is a cumbersome process and it is difficult to ensure an adequate seal in all locations of the basin due to the inaccuracy of the manual spreading process. Fumes from the silicone application can be toxic and cause people to become faint or nauseated. Further, some types of silicone used may break down and contaminate the water, resulting in contaminated distillate.

SUMMARY OF THE INVENTION

The present invention is directed to an improved solar powered distillation system and method that can be provided, cost effectively, to the masses of people worldwide. The improved solar powered distillation system may be made of lightweight, cost effective, and durable materials (e.g., aluminum) and construction to ensure a low cost still that is easily transportable (moveable), affordable and durable so as to provide years of safe clean water production for people at any location throughout the world. The solar powered still may have a waterproof membrane that is extruded, molded, vacuum formed, and/or spray-on and installed in a lightweight basin as a liner for improved ease of still manufacturing and assembly as well as improved sealing. The membrane may be formed so as to create a single water retention area or a plurality of water retention areas in a single basin. The plurality of water retention areas may be constructed in a stair stepped construction. Further, the membrane may include silicone. In a preferred embodiment, the membrane material may be an opaque food grade non-toxic odorless, tasteless silicone, for example, Dow Corning 40/Silicone FDA Ingredients per CFR 177.2600. In another embodiment, the membrane and/or casing materials may be an opaque water grade non-toxic odorless material having a rating meeting American National Standards Institute (ANSI)/National Sanitation Foundation (NSF) Standard 61 for drinking water components. For example, this may include Thermoplastic Vulcanizates (TPV) and their sub-types: Thermoplastic Elastomers (TPE), Thermoplastic Rubbers (TPR), and Ethylene Propylene Terpolymer Rubbers (EPDM). TPV materials include those under the name Sarlink; TPE materials include those under the name Uniprene; TPR materials include those under the name Santoprene. Also meeting ANSI/NSF Standard 61 are silicones such as Dow Corning 732 Multipurpose Sealant Black or other color. Likewise Fiberglass Reinforced Polyester (FRP) such as Bedford Reinforced Plastics Sheet FRP. The solar still basin casing may be made of a material with sufficient structural strength, rigidity and durability such as an aluminum or plastic. In one variation, the solar still basin may be formed from an aluminum sided insulation material, for example, Thermax made by Celotex. In another variation, the still basin casing and interior membranes may be made of a molded acrylonitrile butadyene styrene (ABS) plastic polycarbonate, polyproplylene, or polybutylene. The plastic still basin casing may include one or more strengthening members molded into the formed plastic. In a further variation the solar still may also include a carbon filter attached to either the input or output of the solar still for filtering out VOCs. In an even further variation the solar still may include legs such as fixed legs, or adjustable legs. Adjustable legs may facilitate leveling the still to ensure the most efficient operation possible. In one preferred application, the solar still may be used as a solar water purification system and method. The still may be provided to users in kit form and assembled on location where it is to be used. In any case, the still is a portable cost effective system that may be used to provide distilled water in any location throughout the world.

DESCRIPTION OF THE PREFERRED EMBODIMENTS

Although solar powered distillation systems have been know for some time, a low cost, lightweight, easy to assemble, portable still with good reliability has not been available until the creation of the present invention. As such, until now low cost high volume production of solar power distillation systems has not been viable. The present invention uses a unique set of materials and assembly processes, along with offering a unique method of still operation, to provide a low cost, lightweight, easy to assemble, durable and reliable solar power distillation system that may be sold, shipped to, and used at any location (including remote locations) throughout the world. A preferred application for the solar distillation system of the present invention is water distillation for providing clean safe drinking water. However, the present invention may also be used for other distillations and even for heating liquids (e.g., producing hot water).

Figure 1:
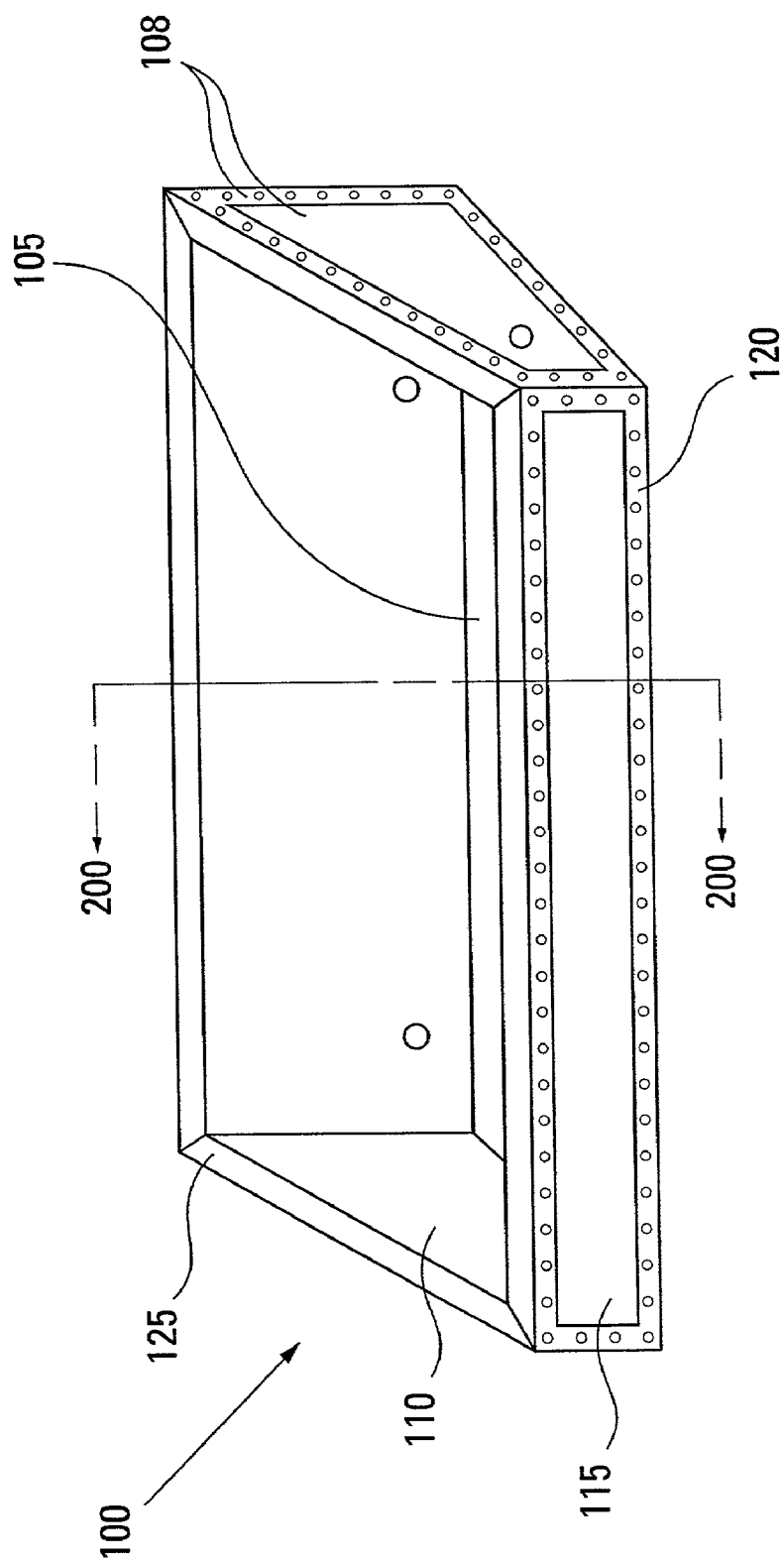
FIG. 1 is a perspective view of an exemplary solar powered distillation system, according to the present invention.

Referring now to FIG. 1, a perspective view of one exemplary embodiment for the solar powered distillation system according to the present invention is provided. The solar powered distillation system 100 includes a basin 105 that may include a basin casing 108 and an impermeable membrane 110 lining the interior surfaces of the basin casing 108. The basin casing 108 may include a structurally rigid and durable outside surface material 115, for example aluminum, lined with an insulation material. Further, the basin casing 108 exterior may be trimmed on its edges and corners with strengthening members 120, preferably made of, for example, aluminum. The exterior of the basin casing 108 is preferably made of durable materials that will hold up to harsh climate conditions including extreme heat (e.g., desert operation). The interior surface of the basin 105 serves at least two distinct purposes: retaining the liquid to be distilled and absorbing sunlight during distillation. Further, the membrane 110 should be easily assembled into the basin 105. As such, in a preferred embodiment the membrane 100 may be made of an opaque material which is extruded as a sheet or molded into the form of the basin 105. In distilled water applications the membrane is preferably made of food grade materials so as to provide safe drinking water that tastes good. One such material may be a blackened silicone, for example, Dow Corning 40 Silicone FDA ingredients per CFR 177.2600, extruded into a sheet and attached to the interior surface of the basin casing 108. Another such material may be Dow Corning 999-A. It is important that the material have a long service life and does not degrade in the presence of ultraviolet rays from the sun. The use of a dark or blackened silicone will help improve absorption of the sun's rays so as to increase the heating of the solar powered distillation system and distillation production.

The solar powered distillation system may be closed by covering the basin 100 with a piece of glass (not shown). The glass may be preferably a tempered glass and be attached to the sill 125 on the basin 105. The glass should seal the basin to produce a sealed solar powered distillation system 100 that retains as much solar heat as possible. In one preferred embodiment the glass may be attached to the basin sill 125 with food grade silicone, for example, Dow Corning 999-A or Dow Corning 732 Multipurpose Sealant. Similarly, the glass may be clamped down or placed in a sliding sleeve.

Figure 2:
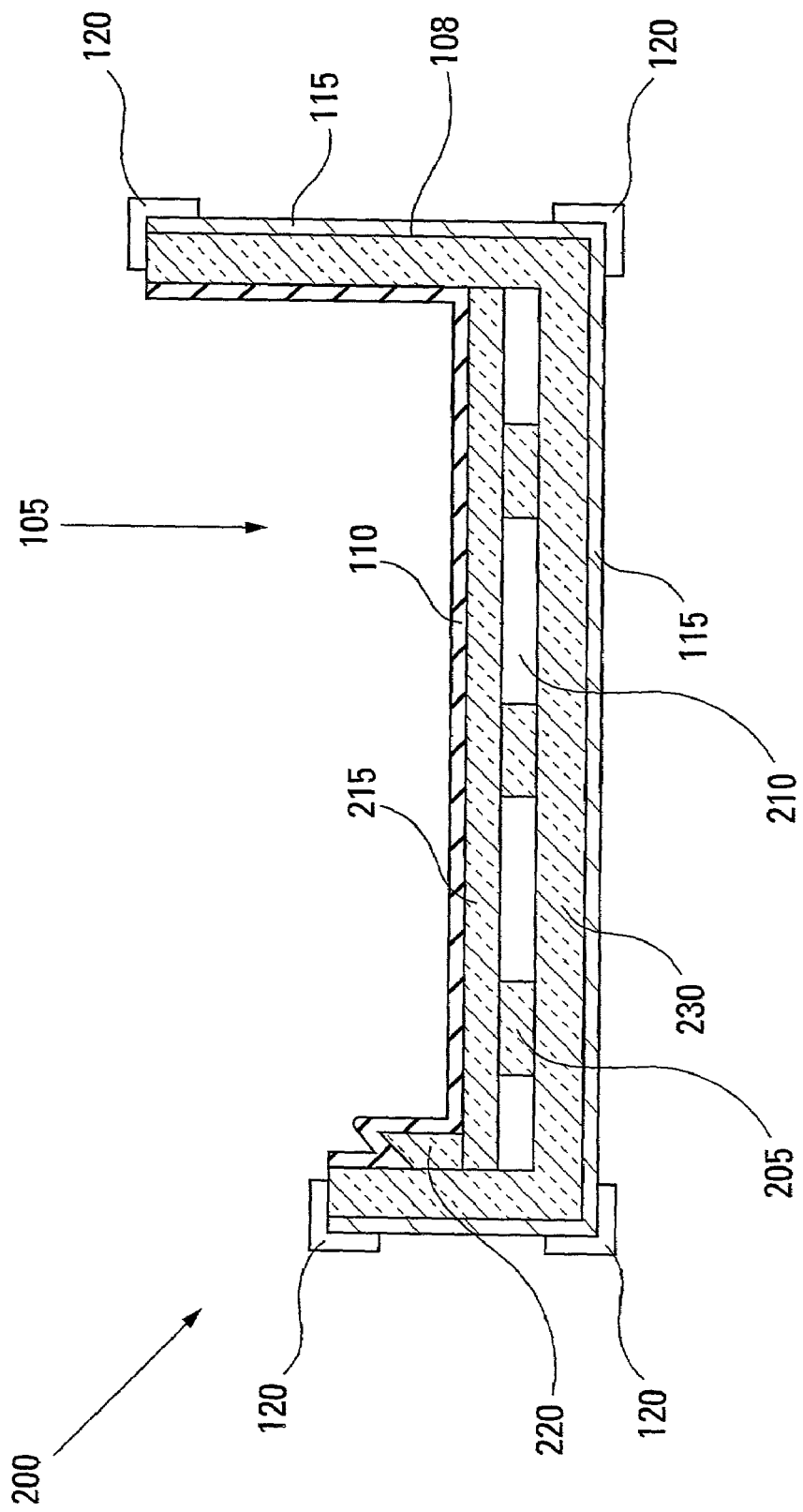
FIG. 2 is a cross section view of the exemplary solar powered distillation system shown in FIG. 1, according to one embodiment of the present invention.

Referring now to FIG. 2, a cross section view taken at line 200 of FIG. 1 is provided for one preferred embodiment. In this embodiment, the basin casing 108 is formed of a thin aluminum sheet 115 bonded to an insulation material 230 as shown. The exterior corners of the basin casing 108 are trimmed with angled structural support members 120 that are preferably made of aluminum. Additional insulation strips 205 may be attached to insulation 230 using, for example, silicone. Another layer of insulation 215 may then be attached to insulation strips 205 using, for example, silicone. As a result the bottom of the basin contains an intermediate layer of air 210 and insulation 205 which will improve the insulating characteristics of the basin 105 because most heat is radiated at the bottom of the basin 105. Another strip of insulation, the distillate collection trough 220, is attached to the short front side wall of the basin 105 and channels the distillate that condenses on the glass cover to an output port (not shown). The various insulation layers may be, for example, polyisocyanurate. In any case, membrane 110 lines the inside of the basin 105. The membrane is preferably a blackened extruded or molded silicone that may be attached to the walls and floor of the inside of the basin 105 so as to retain the distillate liquid. Although not shown in the Figures, membrane 110 may also overlap the basin casing sill 125 as well as the structural support member 120 on the sill 125. A more detailed description of the basin casing 108 and membrane 110 follows.

Figure 3A:
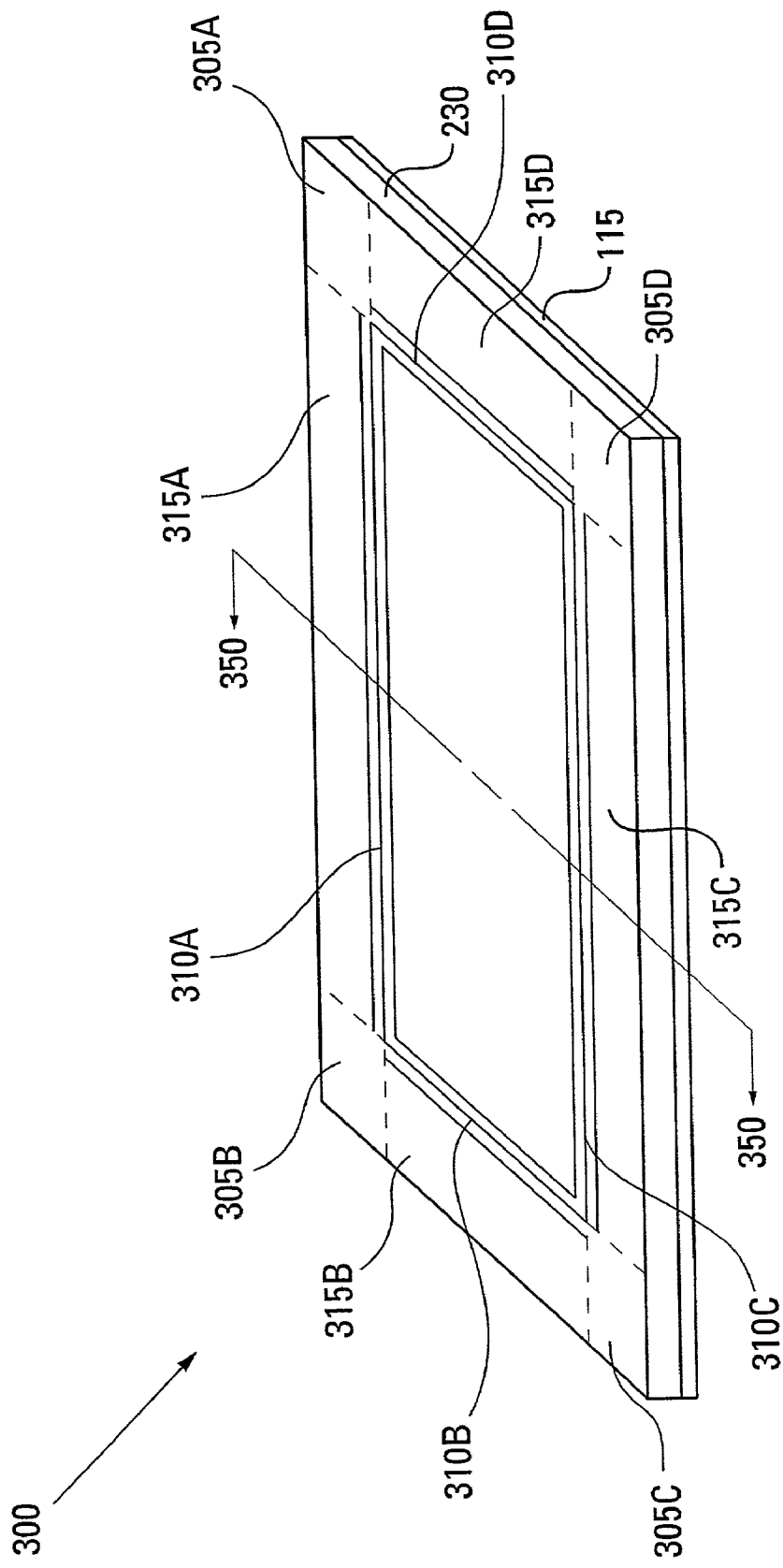
FIG. 3A is a perspective view of an aluminum sided insulation sheet as used and fabricated to form the casing of the still basin, according to one embodiment of the present invention.

FIG. 3A provides one preferred embodiment of the basin casing 108 insulation and siding. As described above, the solar powered distillation system basin casing 108 (without the structural support members 120) may be formed from an aluminum sided insulation sheet 300. A thin layer of pliable aluminum 115 may be adhered to a layer of insulation 230, for example, polyisocyanurate, Styrofoam, etc. The thin layer of aluminum will be the outer surface of the basin casing and provide structural soundness and durability against the outside environment where the still is to be operated. Although the preferred embodiment here is shown with an aluminum outer surface, the material may be any other pliable material, for example a plastic, that exhibits the structural and durability characteristics needed for the still casing. In any case, the basin casing sheet 300 is provided with grooves 310A–310D to allow for portion 315A–315D of the sheet to be folded at a 90 degree angle (perpendicular) to the main surface so as to form the sides of the basin 105. Prior to angling the sides 315A–315D relative to the main surface, the corners of the sheet 300 are eliminated. The sheet 300 may be formed with the corners notched out or the corners may be removed from the rectangular sheet 300 prior to bending the ends 315A–315D up to be perpendicular to the normal flat surface of the sheet 300.

Figure 3B:
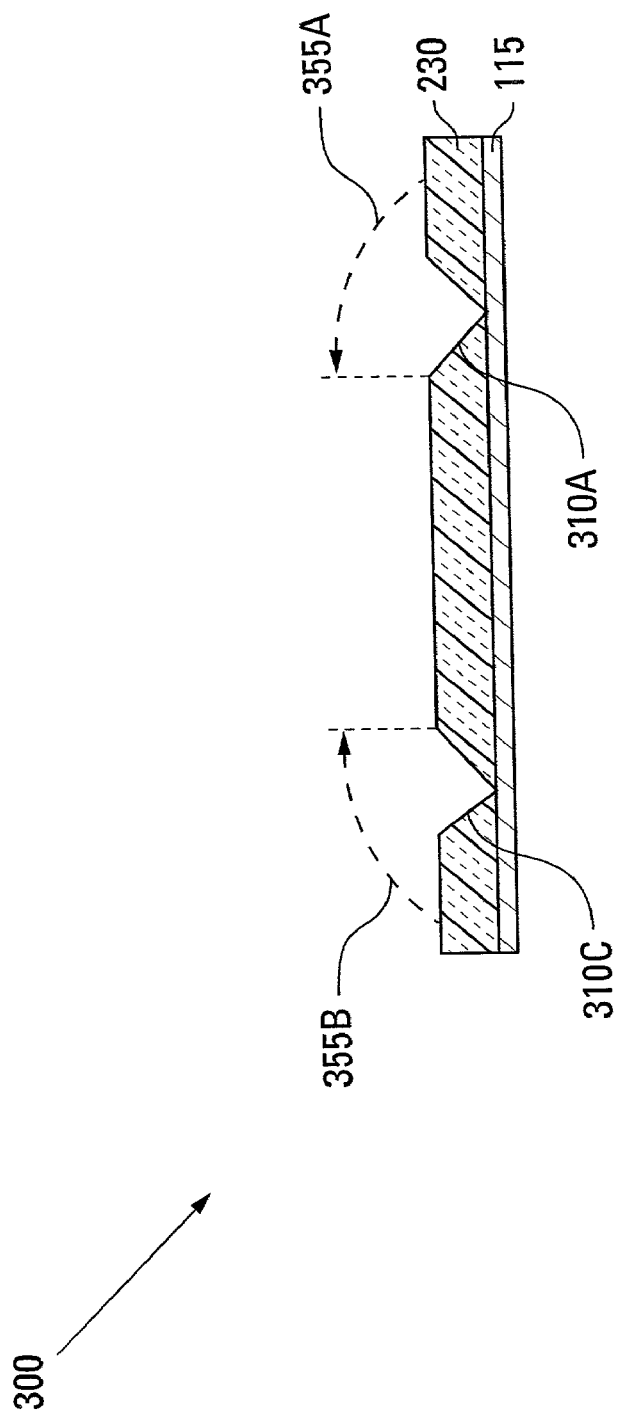
FIG. 3B is a cross section view of the aluminum sided insulation sheet as fabricated for use in forming the casing of the still basin, according to one embodiment of the present invention.

FIG. 3B provides a cross section view of sheet 300 taken across line 350 as fabricated for use in forming the casing of the still basin. As illustrated, the insulation is notched at locations 310A and 310C to enable the sides of the basin 105 to be formed at, for example, a 90 degree angle (bends 355A and 355B) from the single sheet 300. The notches are preferably a 90 degree angle notch that may be formed using a mold during formation of the insulation material 230 or by removing the insulation in these areas (310A and 310C) after a full sheet 300 is formed. In a preferred embodiment sheet 300 is a Celotex building material sheet with aluminum and polyisocyanurate and the grooves 310A–310D are formed in the sheet by, for example, cutting away portions of the polyisocyanurate. In any case, the grooves 310A–310D are formed in the sheet 300, the corners 305A–305D are notched, and the ends 315A–315B are bent up to form sides of the basin 105 that are perpendicular to the bottom surface (aluminum facing outward) of the basin casing 108. This approach provides a cost effective, lightweight, and durable basin casing.

Figure 4A:
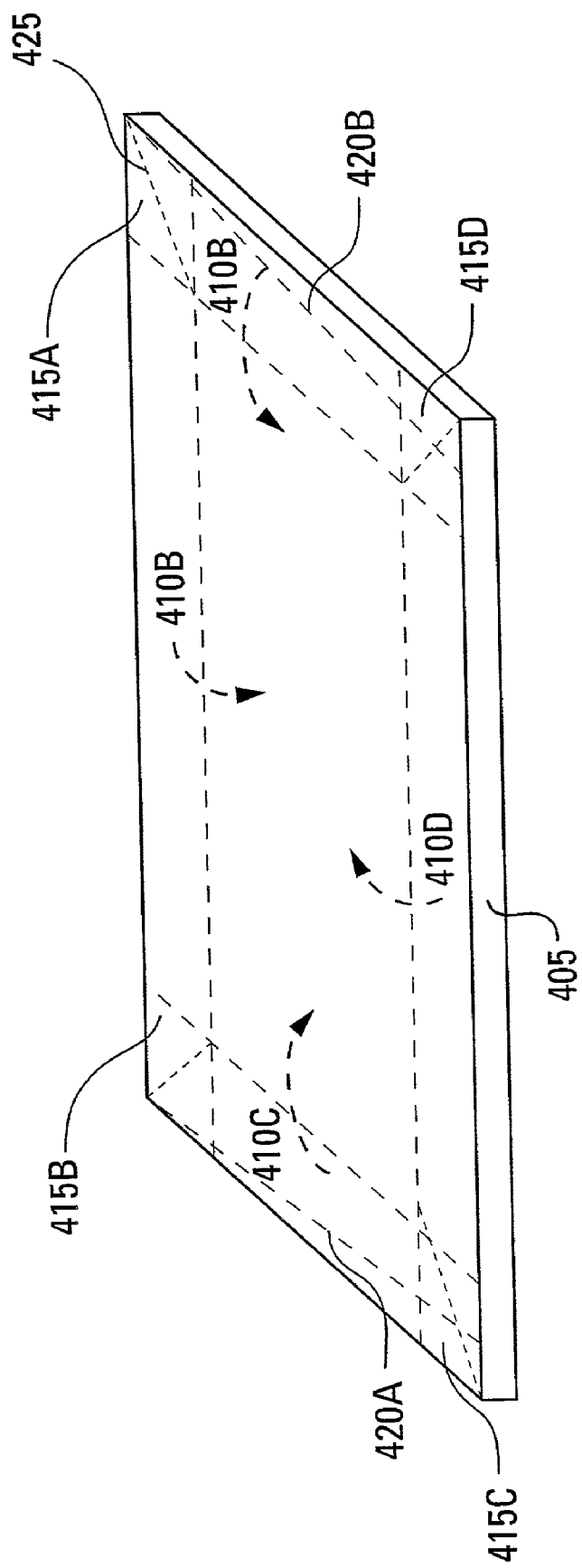
FIG. 4A is a perspective view of an extruded membrane sheet, according to one embodiment of the present invention.
Figure 4B:
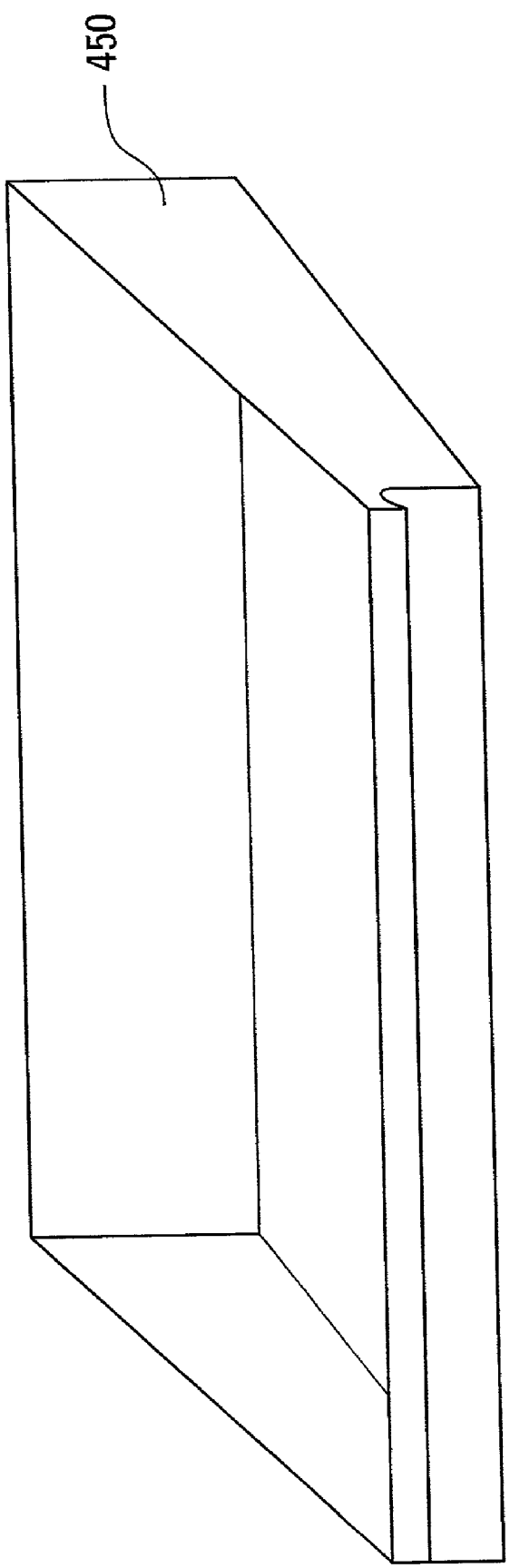
FIG. 4B is a perspective view of a molded membrane basin liner, according to one embodiment of the present invention.

As previously indicated, the membrane 110 may be formed from an extruded sheet (FIG. 4A) or be molded into a preformed shape (FIG. 4B). Turning to FIG. 4A, a perspective view of an extruded membrane sheet 405 used to form the basin lining membrane 110 is provided which indicates the forming processes for fitting the extruded material into a shape to line the solar distillation system basin 105. In a preferred embodiment, the extruded membrane sheet 405 is made of a food grade black silicone, for example Dow Corning 40, and extruded in a rectangular sheet large enough to completely cover the inside of the solar distillation system basin 105 when folded or cut to the shape and size of the basin 105. Although, the membrane 110 may be made of other materials that have characteristics such as being non-toxic, odorless, malleable, impermeable, food grade, and UV resistant. The four sides of the rectangular sheet 405 may be folder 90 degrees as shown by 410A–410D, to make perpendicular sides to coincide with the sides of the basin 105. As indicated by the dashed lines 420A and 420B, two ends of the extruded sheet 405 may be cut to match the slope of the two sloped side walls of the basin 105. The corners 415A–415D may be cut out at the dotted lines or simply folded over so as to form a squared corner of the membrane 110 to form fit inside the squared corner of the basin 105. The folded material of the membrane sheet 405 may be folded toward the inside or outside surface of the membrane 110 corners at, for example, the dotted lines including diagonal line 425. These corner folds may be adhesively attached to the perpendicular walls of the membrane 110 or the walls of the basin, using for example, a silicone such as Dow Corning 999-A. If the corners are cut out then the sides may be connected together with, for example, an adhesive so as to make a sealed membrane 110 which is form fitted to the basin 105. This adhesive may be, for example, a silicone such as Dow Corning 999-A. The membrane may be made of any thickness as long as it is sufficiently durable for installation and use and malleable enough to lie close to the contour of the basin. In one preferred embodiment the membrane may be in the range of 0.010 to 0.150 inches thick for example, 0.025 inches thick. Further, in one variation the Dow Corning 40 silicone may have FDA ingredients per CFR 177.2600.

Another method of making the impervious membrane 110 is using a molding process. FIG. 4B is a perspective view of such a molded membrane basin liner according to one embodiment of the present invention. As illustrated, the molded method eliminates the need for manually shaping the membrane material to fit into the basin 100, which can save assembly time and improve the integrity of the membrane 110.

A still further method of making the impervious membrane 110 is spraying the material onto the basin 105. The membrane material to be sprayed on, for example silicone, could be in liquid form and applied with air pressure in a manner similar to spray painting. Alternatively, the material could be contained in a gas pressurized or aerosol can and may thus be easily applied on-site. This approach may be most beneficial if the solar power distillation system is shipped to location in kit form and assembled on site.

Figure 5:
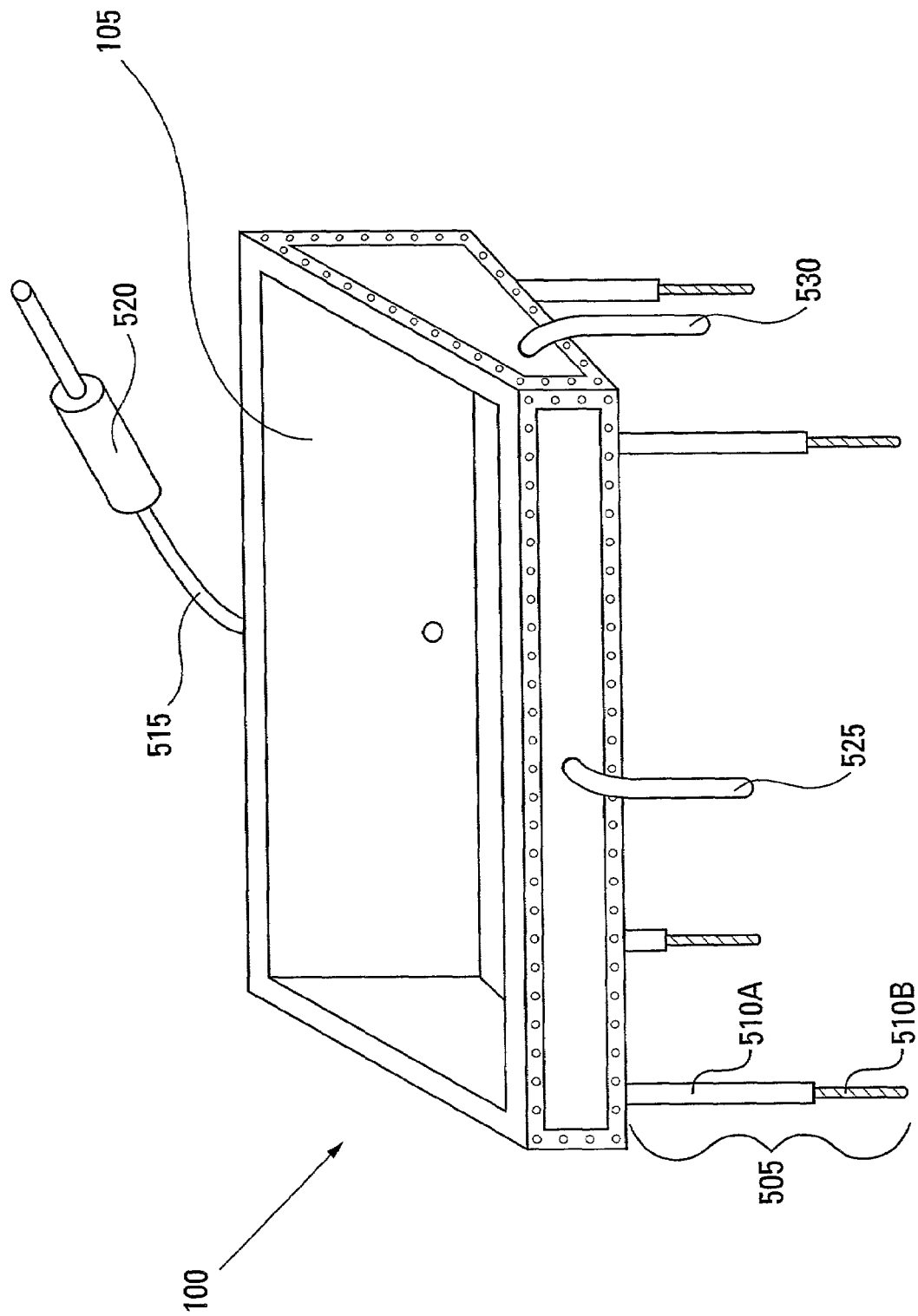
FIG. 5 is a perspective view of another exemplary solar powered distillation system, according to another embodiment of the present invention.

Referring now to FIG. 5, another exemplary solar powered distillation system 100 according to the present invention will be described. In this embodiment, the solar power distillation system includes legs, various inlet and outlet ports with tubes, and a carbon filter. First, adjustable legs 505, preferably four legs, are provided so that the basin 105 may be easily set up and leveled for maximum distillation efficiency. The adjustable legs 505 may include a first section 510A and a second section 510B with which associated with one another so that the combination allows for adjustable leg length. In a preferred embodiment the second section 510B may be threaded and screw in and out of the first section 510A. Of course the sections and their respective operations could be reversed. In another embodiment, the adjustable legs may have two or more sections that slide in and out of one another and use a friction based locking mechanism to set and secure the length. The legs 505 may also be folding legs so that they may be folded parallel to the underside of the still 100 basin for convenient shipping, carrying, and storage. Alternatively the legs 505 may be affixed to the basin with a quick disconnect bracket.

The solar powered distillation system may also include an inlet port and hose 515, an overflow outlet port and hose 525, and an outlet port and hose 530. The hoses may be made of a flexible silicone based material and be food grade. Further, a carbon filter 520 may be provided on the inlet port 515 or the outlet port 530 so as to filter out VOCs that may not be completely removed during the distillation process. The carbon filter will remove volatile organic compounds (VOCs) such as pesticides and petroleum distillates from, for example, a source water supply or distilled water output by the system. In a preferred embodiment the carbon filter 520 is connected to the inlet port and hose 515.

Figure 6:
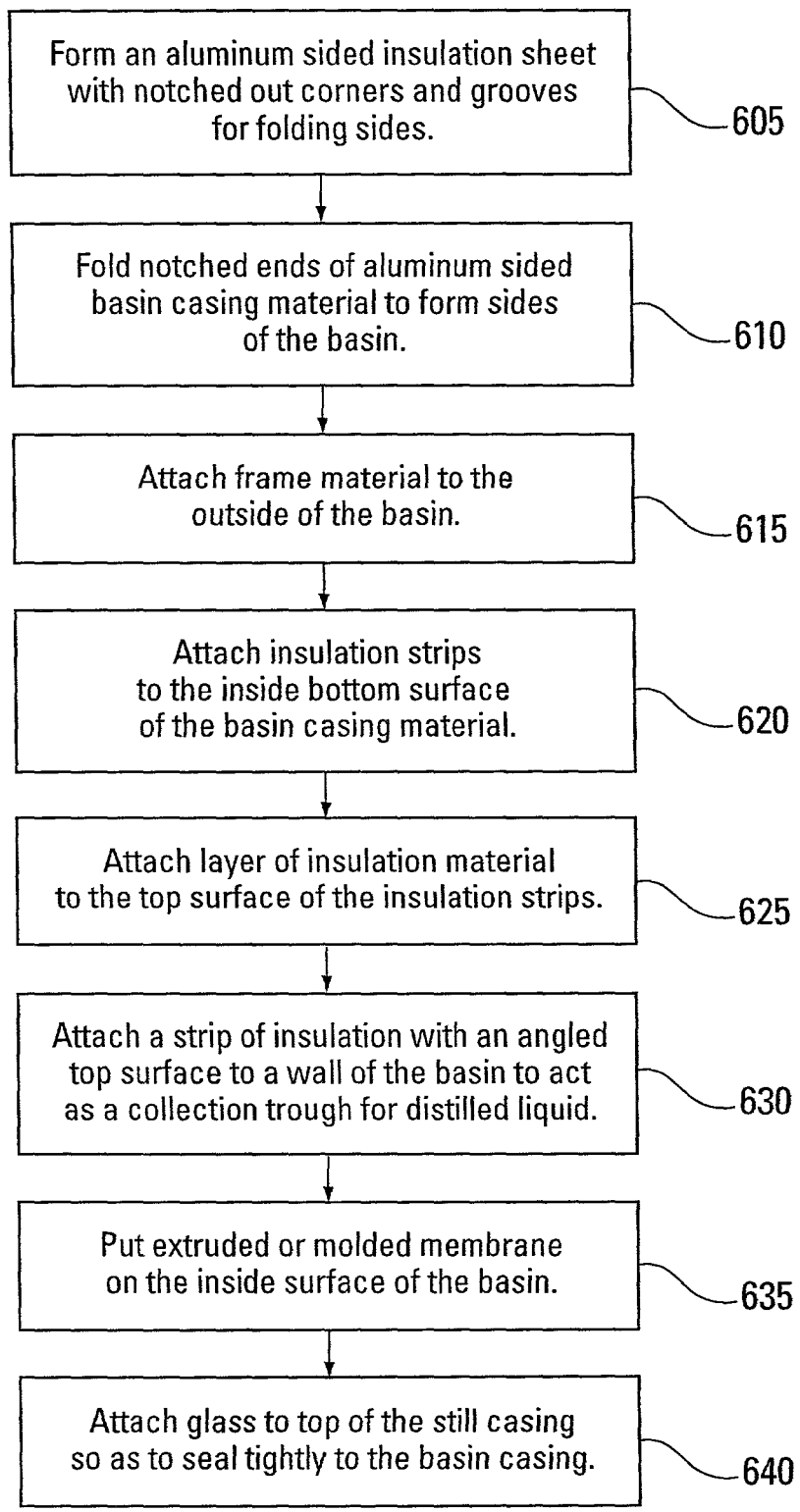
FIG. 6 illustrates a flow chart of one method for assembling a solar powered distillation system, according to one variation of the present invention.

Referring now to FIG. 6, one method of assembling a solar powered distillation system according to one variation of the present invention will be explained. First, at step 605, an aluminum sided insulation sheet 300 is formed to have corner notches and grooves for folding up side panels (see FIGS. 3A and 3B). Next, at step 610, the ends of the sheet 315A–315D are folded up, preferably perpendicular to the rest of the sheet, to form the sides of a solar power still basin casing 108. Then, at step 615, a structural framing 120 is attached to the outside corners of the aluminum sided basin casing to complete the basin casing 108. Next, at step 620, one or more insulation strips 205 are attached to the bottom inside surface of the basin casing 108. Then, at step 625, a sheet of insulation 215 is attached to the one of more insulation strips 205. Of course, inclusion of the insulation strips 205 is not necessary and this step could be eliminated in one variation of the invention. In either case, next at step 630 a collection trough is created by attaching a strip of preferably insulation material having either straight or angled top edge, to the shorter side wall inside surface of the basin casing 108. The collection trough will collect distilled liquid and channel it to an output port. Then, at step 635, the extruded or molded membrane 110 is placed on the inside surfaces of the basin casing 108 to act as a liner. The membrane 110 may be attached to the inside surfaces of the basin casing 108 using, for example, a silicone material such as Dow Corning 999-A. Next, at step 640, a glass panel is attached to the top of the still so as to seal the basin for efficient operation. The glass may be attached to the basin by using, for example, a bead of silicone, a rubber seal and locking mechanisms, or any other sealing method.

Figure 7:
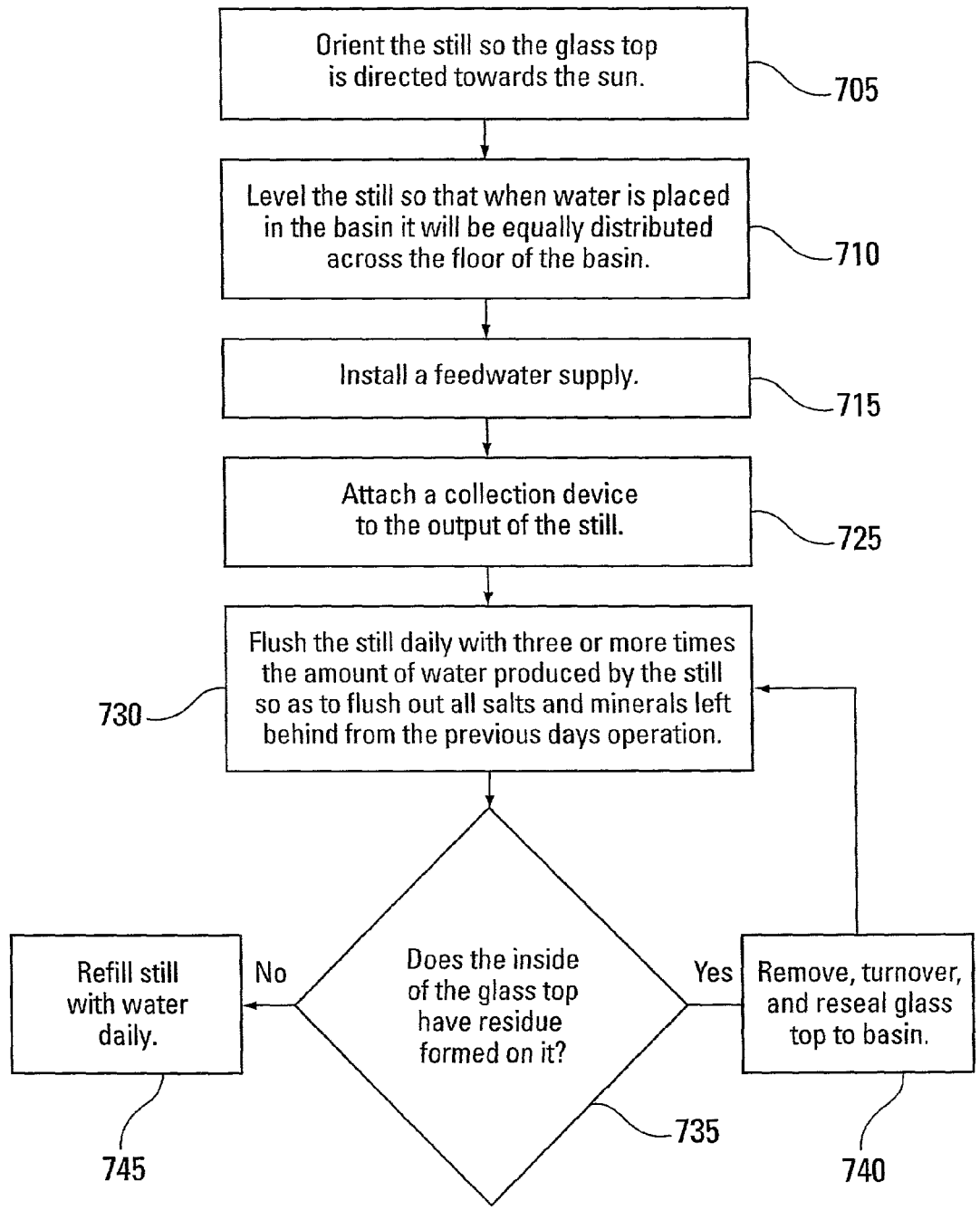
FIG. 7 illustrates a flow chart of one method of operating a solar powered distillation system, according to one variation of the present invention.

As discussed above, the invention may be used for distilling water to produce safe drinking water. One exemplary method for operating the solar powered distillation system for distilling drinking water is shown in FIG. 7. A solar still operates on the same mechanism that produces rainwater: evaporation. The solar powered distillation apparatus may be operated by introducing water into the inlet and recovering distilled water from the outlet. First, in step 705, for maximum output the still 100 should be place in a location receiving a maximum amount of sun and oriented to direct the angled glass top towards the sun. Next, in step 710, the still 100 should be leveled so that when the water is put in the still basin 105 the water covers the bottom of the basin 105 equally in all locations. This will also help to maximize distillation output. Next, at step 715, a feedwater supply is introduced into the still via an input port. The feedwater supply may be a bucket or other container attached to an inlet hose or a garden hose with pressurized water connected to the inlet hose. The feedwater is often times manually inputted using a container and is not required to be pressurized. Then at step 725, a collection device is connected to an output port, preferable via a silicone hose.

Once the system is flushed, the water to be cleaned is poured into the still 100 to partially fill the basin 105. The glass cover allows the solar radiation (short-wave) to pass into the still 100, which is mostly absorbed by the blackened base. The water begins to heat up and the moisture content of the air trapped between the water surface and the glass cover increases. The base of the membrane 110 also radiates energy in the infra-red region (long wavelength) which is reflected back into the still 100 by the glass cover. Thus, the glass cover traps the solar energy inside the still 100. The heated water vapor evaporates from the basin and condenses on the underside of the glass cover. The condensed water trickles down the inclined glass cover to an interior collection trough and is delivered to the collection device which may be, for example, a glass storage bottle. This procedure should be followed each day.

Next, at step 730, each day the still should be flushed with approximately three or more times the amount of water produced by the still daily to remove various salts and minerals left behind in the still from the previous days operation. Then, at decision step 735, it is determined whether the inside of the glass top has a residue formed on it. If the glass appears cloudy and the amount of distilled water production is less then normal it is likely that a residue has formed on the inside of the glass. This residue may cause resistance to the flow of condensed water along the glass top to the collection trough. If so, then large condensation droplets form along the glass top and fall back into the basin 105 before reaching the collection trough. If this occurs, then at step 740 the glass top is removed, turned over, and resealed to cover the basin 105. If not, then at step 745, the still 100 is refilled with water to be distilled.

Figure 8:
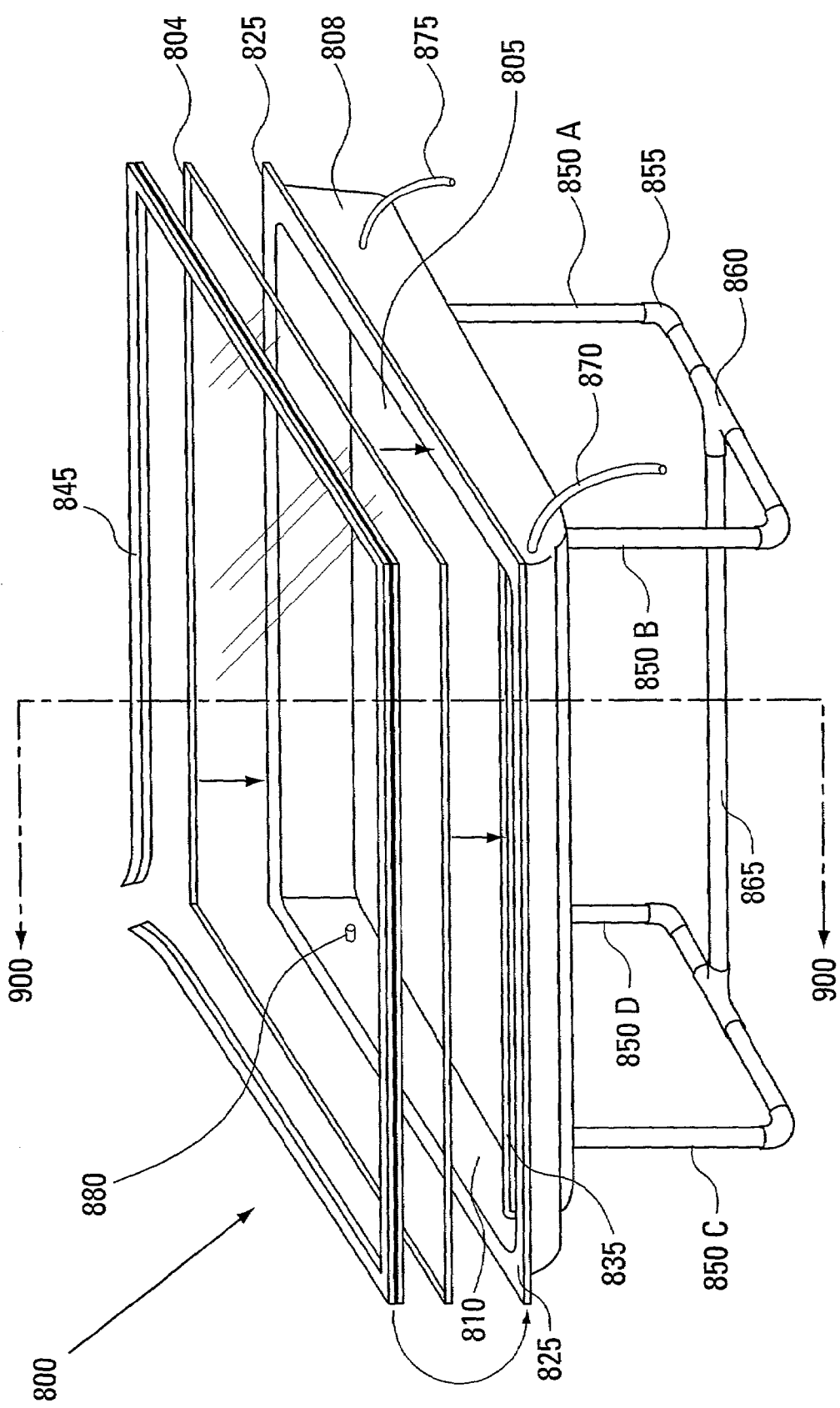
FIG. 8 is a perspective view of a still further exemplary solar powered distillation system, according to another embodiment of the present invention.

Another exemplary solar powered distillation system is illustrated in FIG. 8. The solar powered distillation system 800 includes a pre-distillation basin 805 and a post-distillation collection trough 835 that may be include in a basin casing 808 and an impermeable membrane 810 lining the interior surfaces of the basin casing 808. As in previous embodiments, the exterior of the basin casing 808 is preferably made of durable materials that will hold up to harsh climate conditions including extreme heat (e.g., desert operation). For example, in this case the basin casing may be vacuum formed or molded from a petroleum or plastics based product and the still may include legs that may be formed with a plastic or poly vinyl chloride (PVC) material. In a preferred embodiment, the still basin casing 808 may be made of a structurally rigid and durable outside surface material such as a molded acrylonitrile butadyene styrene (ABS) polycarbonate, polypropylene, or polybutylene. The basin casing 808 may be lined with an insulation material in between the basin casing 808 and the impermeable membrane 810. Although not shown in FIG. 8, the basin casing 808 exterior may be trimmed on its edges and corners with strengthening or reinforcement members to ensure the structural integrity of the basing casing 808, made of, for example, a more rigid plastic material or a metal such as aluminum.

The interior surface of the basin 805 serves at least two distinct purposes: retaining the liquid to be distilled and absorbing sunlight during distillation. The membrane 810 should be easily assembled into the basin 805. As such, in a one embodiment the membrane 810 may be made of an opaque material which is extruded as a sheet and constructed or cut to form-fit into the basin 805. Alternatively, the membrane 810 may be molded or vacuum formed to form-fit into the basin 805. The membrane should be made of a material impervious to the liquid to be distilled and should not contribute contaminates to the solar distillation system. In distilled water applications the membrane may be made of non-toxic food grade materials (quality for contact with food) or water grade materials (quality for contact with water) compliant with ANSI/NSF Standard 61 for drinking water system components, so as to provide safe drinking water that tastes good. One such food grade material may be a blackened silicone, for example, Dow Corning 40/Silicone FDA ingredients per CFR 177.2600, that may be extruded into a sheet or molded into the shape of the basin casing 808 interior and collection trough 835, and attached to the interior surface of the basin casing 808. Another such food grade material may be Dow Corning 999-A. The water grade material useful for the membrane 810 may be ANSI/NSF Standard 61 drinking water contact compliant grade materials such as silicones (SLC), thermoplastic vulcanizates (TPV), and fiberglass reinforced polyesters (FRPs). SLCs may include, for example, Dow Corning Silicone 732. FRPs may include, for example, a Bedford Reinforced Plastic Sheet. There are several TPV subtypes including thermoplastic elastomers (TPEs), thermoplastic rubbers (TPR), and ethylene propylene terpolymer rubbers (EPDMs). One exemplary TPV is Sarlink 5000. One exemplary TPE is Uniprene 7010-40D NT Black manufactured by Teknor Apex Company. One exemplary TPR is Santoprene 143-50 manufactured by Advanced Elastomer Systems. In any case, it is useful that the material used have a long service life and does not degrade in the presence of ultraviolet rays from the sun. The use of a dark or blackened membrane material will help improve absorption of the sun's rays so as to increase the heating of the solar powered distillation system and distillation production. In a preferred embodiment, all still materials may be made of ANSI/NSF Standard 61 and the entire still and system may be ANSI/NSF Standard 62 qualified for approval as an ANSI/NSF compliant drinking water distillation system.

The solar powered distillation system 800 may be closed by covering the basin 805 with a piece or sheet of transparent material 840 such as clear plastic, glass, tempered glass, Plexiglas, etc. The transparent material 840 is preferably a tempered glass and attached to a sill 825 integrally formed with the still basin casing 808. Preferably the sill 825 may be covered with membrane material 810. The transparent material 840 should seal the basin to produce a sealed solar powered distillation system 800 that retains as much solar heat as possible. In one preferred embodiment, the transparent material 840 may be removably attached to the basin sill 825. For example, the transparent material 840 may be attached or clamped down using a rubber and metal seal 845 having, for example, a C shape or grove. This feature will be shown more clearly in FIG. 12. In one variation, the transparent material 840 may be placed in a sliding sleeve. Alternatively, the transparent material 840 may be attached to the basin sill 825 with a food or water grade silicone such as those listed above.

In one embodiment, the solar power distillation system may also include legs and various inlet and outlet ports with tubes. First, vertical legs 850, preferably four legs 850A–850D, are provided so that the basin 805 may be easily set up and leveled for maximum distillation efficiency. The vertical legs 850A–850D may be tubing and removably attached to the bottom or sides of the basin casing 808. In a preferred embodiment the vertical legs 850A–850D may be fitted into female fitting portion or over a male fitting portion formed on the bottom of basin casing 808 (as will be shown in more detail in FIG. 11). Further, the vertical legs 850A–850D may be coupled together using a plurality of L joints (e.g. 855), T joints (e.g., 860) and straight pieces (e.g., 865). The various pieces may be fastened to one another and the vertical legs 850A–850D using standard fasteners and/or glue. Most importantly, the L joints are attached to the vertical legs 850A–850D and their respective straight pieces 865. In this manner, the legs can adequately support the solar distillation basin and its attachments filled with liquid. In a preferred embodiment the vertical legs 850A–850D and their related joints and straight pieces (e.g., 855, 860, 865) may be made of a poly vinyl chloride (PVC) using, for example, a schedule 80 or 40 pipe (e.g., 1" diameter pipe). The PVC is preferably of a dark grey color so as to hold up better in hot sunny climates (e.g., deserts). The vertical legs 850A–850D and their related joints and straight pieces may be stored in the still basin for shipping.

Of course, as shown in earlier embodiments the legs may be removable, adjustable and/or retractable. For example, vertical legs 850A–850D may be folding legs so that they may be folded parallel to the underside of the still basin casing 808 for convenient shipping, carrying, and storage. The legs 850 may further be affixed to the basin with a quick disconnect bracket.

The solar powered distillation system may also include an inlet port and hose 880, an overflow outlet port and hose 875, and an outlet port and hose 870. The hoses may be made of a flexible silicone based material and be food grade and/or water grade. Further, a carbon filter (not shown) may be provided on the inlet port 880 or the outlet port 870 so as to filter out VOCs that may not be completely removed during the distillation process. The carbon filter will remove VOCs such as pesticides and petroleum distillates from, for example, a source water supply or distilled water output by the system. In a preferred embodiment the carbon filter is connected to the inlet port and hose 880.

Figure 9:
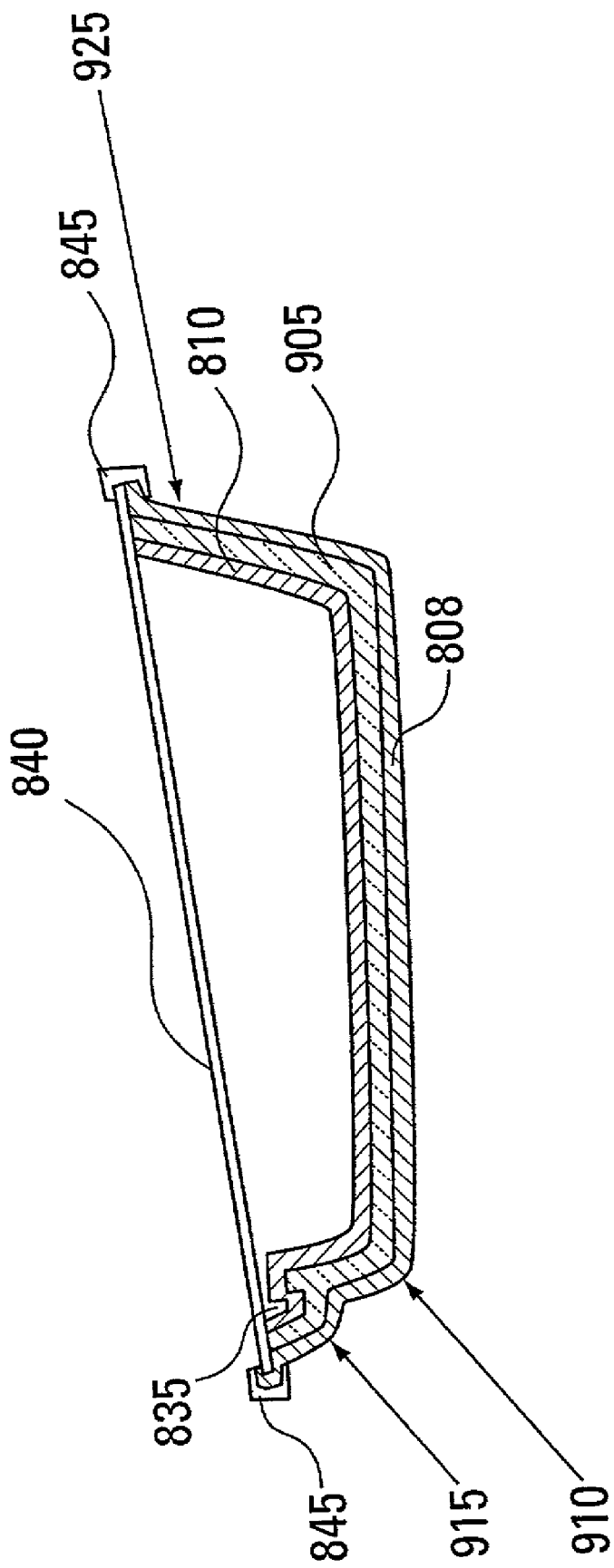
FIG. 9 is a cross section view of the basin of the exemplary solar powered distillation system shown in FIG. 8, according to one embodiment of the present invention.

Referring now to FIG. 9, a cross section view of the still basin 805 is shown, as taken viewed from line 900—900 of the solar powered distillation system shown in FIG. 8. The still basing casing 808 is formed of, for example, an ABS plastic using, for example, a vacuum molding, blow molding, or injection molding process. Other still basin casing materials, for example, polycarbonate and/or polybutylene, are also possible so long as they are sufficiently rigid and strong. Two curved portions 910 and 915 are formed in the front side of the still basin casing 808 to create a sill to form the collection trough 835 and provide rigidity to the basin casing 808. Next, an insulating layer 905 may be formed on the inside of basin casing 808. The insulating layer 905 may be formed using a molding process such as vacuum molding, blow molding, or injection molding and be generally conformal to the shape of the still basin casing 808. Although, the insulating material may be thicker in some areas than others to achieve the particular insulating properties and interior basin dimensions desired In one variation the insulation layer 905 may be sprayed onto the still basin casing 808. The insulation layer 905 may be, for example, polyisocyanurates, Styrofoams, or other light weight materials which have good insulating properties. Then, membrane layer 810 is formed over and/or attached to the insulating material 905. In this case, membrane layer 810 is conformal to the insulating material layer 905. Next, the transparent material 840 may be attached or clamped down to a lip portion of the basin casing 808 which forms the basin sill 825, using a rubber and metal seal 845 having, for example, a C shape or grove. Further, note that in one embodiment side 925 has a slight open angle from the bottom to the top of the still basin 805, rather than being perfectly perpendicular to the bottom planar surface of the still basin 805. This slight angle assists in stacking one still basin on top and inside another still basin for improved storage, shipping, and handling. Further, it is noteworthy that the transparent material 840 has a slight upward slope from the front of the still basin 805 to the back (925) of the still basin 805 so that the still basin can operate with the bottom of the still basin level and the condensed water from the still will then collect on the transparent material 840 and flow down to the front of the still basin 805 and collect in the trough 835.

Figure 10:
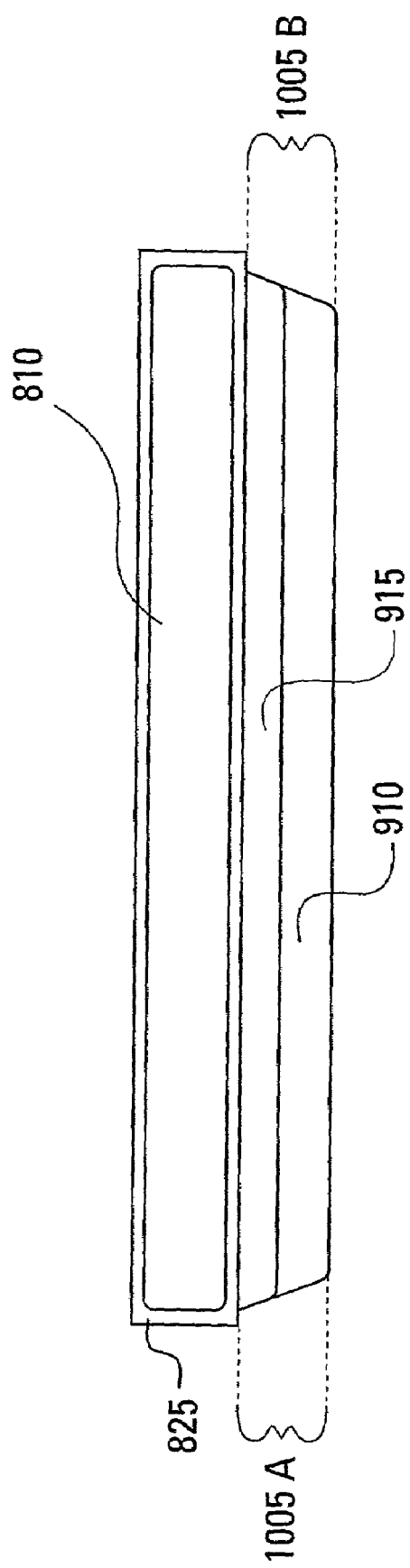
FIG. 10 is a front view of the basin of the exemplary solar powered distillation system shown in FIG. 8, according to one embodiment of the present invention.

FIG. 10 illustrates a front view of the basin 805 for the exemplary solar powered distillation system shown in FIG. 8. As noted with reference to FIG. 9, there are two curved portions 910 and 915 that are formed in the front side of the still basin casing 808 to create a sill to form the collection trough 835 on the inside of the basin (not shown). The curved portions also provide rigidity to the basin casing 808 and assist in stacking one still basin on top and inside of another still basin for ease of storage, shipping and handling. Similarly the left side 1005A and right side 1005B of the still basin casing 808 are sloped outward from the bottom to the top of the still basin 805, for ease of storage, shipping and handling. As shown in FIG. 8, the still basin 805 is covered on the inside with a membrane 810 and the still basin 805 has a sill 825 for supporting and attaching thereto a transparent material 840, e.g., a tempered glass plate.

Figure 11:
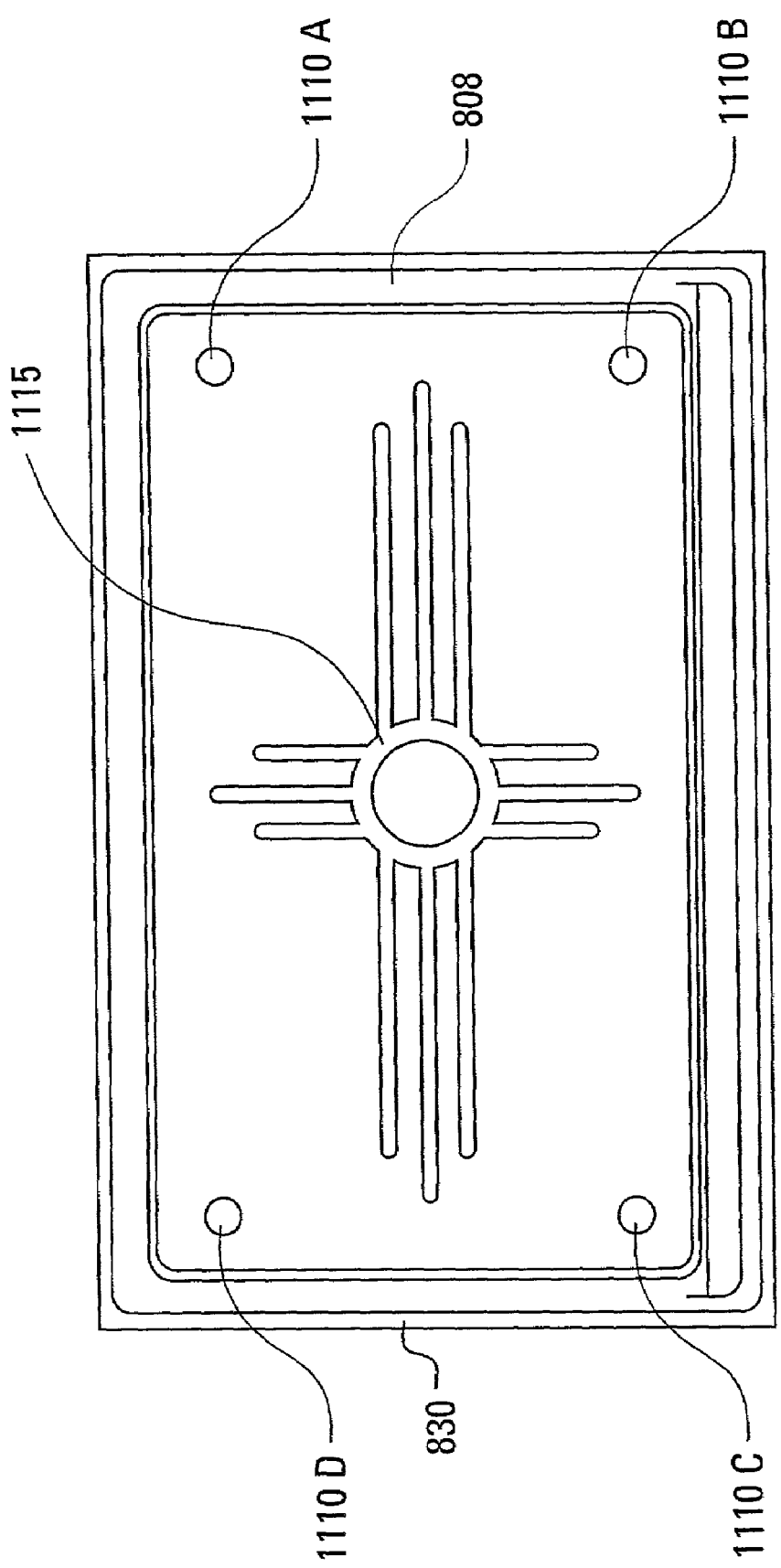
FIG. 11 is a top view of one possible basin casing of the exemplary solar powered distillation system shown in FIG. 8, according to one embodiment of the present invention.

FIG. 11 is a top view of one possible basin casing 808 of the exemplary solar powered distillation system shown in FIG. 8. The still basin casing 808 may include one or more strengthening members to support the weight of the water in the still basin 805 and improve the rigidity of the still basin, and may be connected to or formed in the basin casing 808. For example, a contour may be provided in the bottom of the still basin casing 808. In the case of a molded basin casing, the design may be formed integral to the basing casing during the molding process. This is particularly applicable to a molded basin casing 808 made of a plastic including, for example, ABS, polycarbonate and/or polybutylene. The contour may be concave or convex relative to the inner surface of the still basin 805 and may be of any design sufficient to give strength and rigidity to the bottom of the still basin 805. For example, as shown in this embodiment, a sun design 1115 may be formed on the bottom surface of the still basin casing 808. Another possible shape would be a basic X or cross shape. In any case, each arm of the basic shape (e.g., sun, cross, X) may include one of more fingers as may be needed to obtain the rigidity and strength in the bottom of the still basin 805 and may be oriented in any direction along the bottom surface. In a preferred embodiment, the fingers have a sufficient width and depth so as to have additional strengthening and rigidity when coated with an insulating material and/or membrane material.

The bottom of the basin casing 808 may also have a plurality of fittings for attaching legs to support the basin casing, or simply to act as supports if the still basin is set on a table top. For example, circular female or male fittings 1110A–1110D may be formed in the bottom of the basing casing 808 as shown in FIG. 11. In a preferred embodiment the fittings are female fittings as viewed from the underside of the basin casing 808 and the round legs 850A–850D made of 1 inch PVC piping fit snuggly in the female fittings 1110A–1110D so that they fit snug and are held in with friction. Each of the female fittings 1110A–1110D may have an open end for receiving the legs 850A–850D and a closed end for stopping the legs 850A–850D from being inserted further. The female fittings 1110A–1110D may also have a slight taper from open end to closed end and/or a ribbed side wall cylinder to enhance the friction fit of the legs 850A–850D. In the case that the fittings are to support the basing casing 808, with or without legs, the fittings would be male fitting protruding out from the bottom surface of the basin casing. The fittings 1110A–1110D and legs 850A–850D may include threads so as to thread together and offer one means of adjustment for leveling the still basin 805. Of course, the fittings 1110A–1110D need not be circular as shown in the exemplary embodiment of FIG. 11, but may indeed be of any convenient and useful shape such as a square, star, etc.

Figure 12:
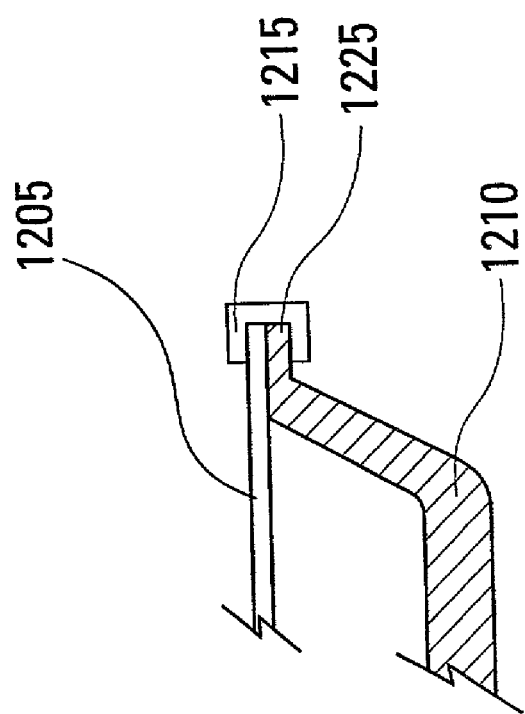
FIG. 12 is a partial cross section view of one method used to couple a sheet of glass to the basin casing of the exemplary solar powered distillation system shown in FIG. 8, according to one embodiment of the present invention.

Referring now to FIG. 12, a partial cross section view is shown of one method used to couple the transparent layer, for example a tempered sheet of glass, to the basing casing of the solar powered distillation system. The basin 1210 may include a basin casing with insulation and a membrane layer formed thereon. A transparent layer 1205, for example a sheet of tempered glass, is placed on the sill or lip 1225 of the basin 1210. A spring loaded trim strip 1215 is pushed onto the combination lip 1225 and transparent layer 1205 so as to clamp and friction seal the transparent layer 1205 to the basin lip 1225. The spring loaded trim strip may be made of a rubber coated C or U shaped metal strip. In one variation the combination may create an air tight seal, such as Trimlock. In one variation an adhesive such as silicone could be also applied to help create an air tight seal of the transparent layer 1205 and the basin lip 1225. In this case the spring loaded trim strip need not be covered with rubber. Of course, as in the earlier embodiments, the transparent layer 1205 may be sealed to the basin lip 1225 with only an adhesive such as a silicone, without the use of a spring loaded trim strip.

The membrane and/or basing casing may be formed to include a plurality of water retention areas in a single still basin. One embodiment of the present invention may include a stair stepped membrane having a plurality of liquid retention reservoirs or areas in the still basin as shown by the exemplary illustration in FIG. 13. In this case the membrane 1315 is formed to be stair stepped and have 3 primary liquid retention areas such as liquid retention areas 1305A, 1305B and 1305C. However, there may be any number of separate liquid retention areas formed in the membrane 1315. The multi stair-step approach can be designed to increase overall evaporative areas for the feedwater supply, thus increasing distillate productiong; in addition, the stair-step approach can be designed in such a manner as to decrease convective heat losses within the still, also furthering overall distillate production. In addition, there may be an overflow area 1330 formed in the membrane 1315 between the distillate collection trough and feedwater troughs, thus decreasing likelihood of potential crossover contamination of feedwater by reducing the possibility of feedwater entering the distillate collection trough. This also serves as an overflow trough for when the feedwater collection areas are full of water. As shown, in one embodiment the insulation layer 1310 may be formed conformal to the still basin casing 1308, similar to the single liquid retention area membrane embodiments. The various insulation layer 905 may be, for example, polyisocyanurate, Styrofoam, or other light weight materials that have good insulating properties. In this case an open airspace 1320 may be formed between the bottom of the membrane 1315 and the top of the insulating layer 1310 under the primary liquid retention areas 1305A–1305C. In variations of this embodiment, as in previously describe embodiments, the airspace may include strips of insulating material that physically support at least a portion of one or more of the primary liquid retention areas 1305A–1305C, or be completely filled with insulating material.

The multiple liquid retention reservoir membrane 1315 may be formed from an extruding or molding process and formed to fit into the still basin. Again, the membrane 1315 should be made of a material impervious to the liquid to be distilled and should not contribute contaminates to the solar distillation system. In distilled water applications the membrane 1315 may be made of, for example, non-toxic food grade materials (quality for contact with food) or water grade materials (quality for contact with water), so as to provide safe drinking water that tastes good. One such food grade material may be a blackened silicone, for example, Dow Corning 40/Silicone FDA ingredients per CFR 177.2600, that may be extruded into a sheet and folded to obtain the multiple reservoirs, or molded into the multiple reservoir shape that will fit in the basin casing 1308 interior and collection trough 1325, and attached to various interior surfaces of the basin casing 1308. Another such food grade material may be Dow Corning 999-A. The water grade material useful for the membrane 810 may be ANSI/NSF Standard 61 grade materials for drinking water system components, as indicated above, such as silicones (SLC) like Dow Corning Silicone 732, fiberglass reinforced polyesters (FRPs), thermoplastic vulcanizates (TPV) such as Sarlink 5000, EPDMs, TPEs such as Uniprene manufactured by Teknor Apex Company, or TPRs such as Santoprene manufactured by Advanced Elastomer Systems.

Figure 13:
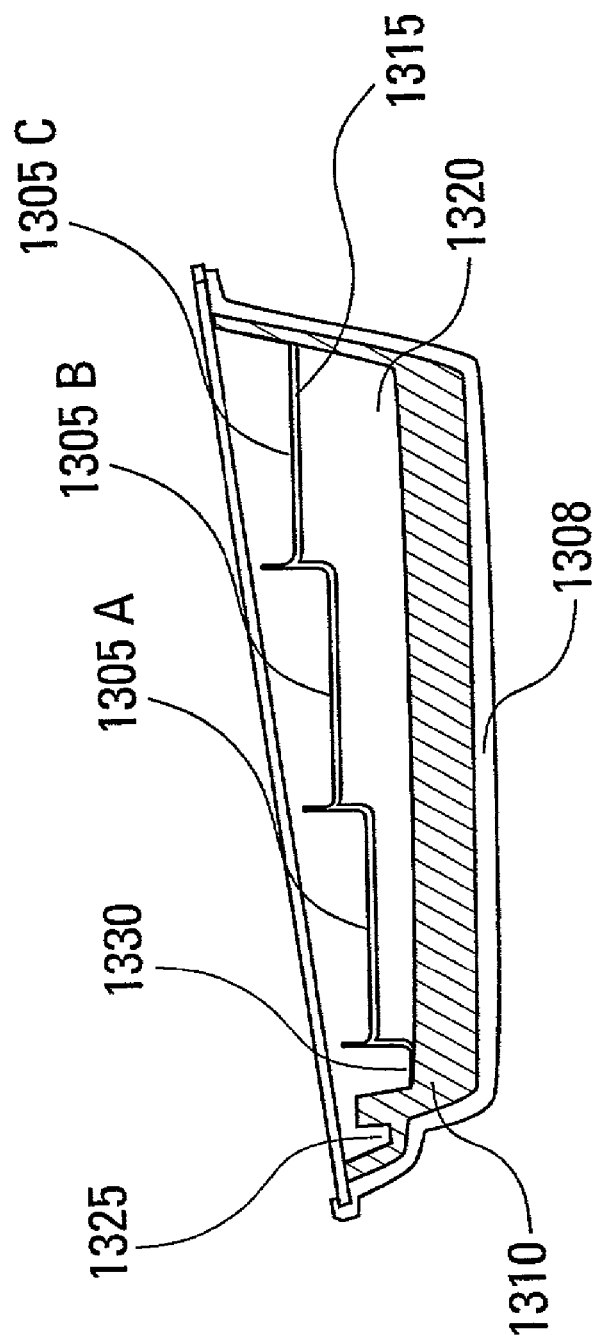
FIG. 13 is a cross section view of a basin of one exemplary solar powered distillation system including a stair step multiple water retention area membrane, according to one embodiment of the present invention.
Figure 14:
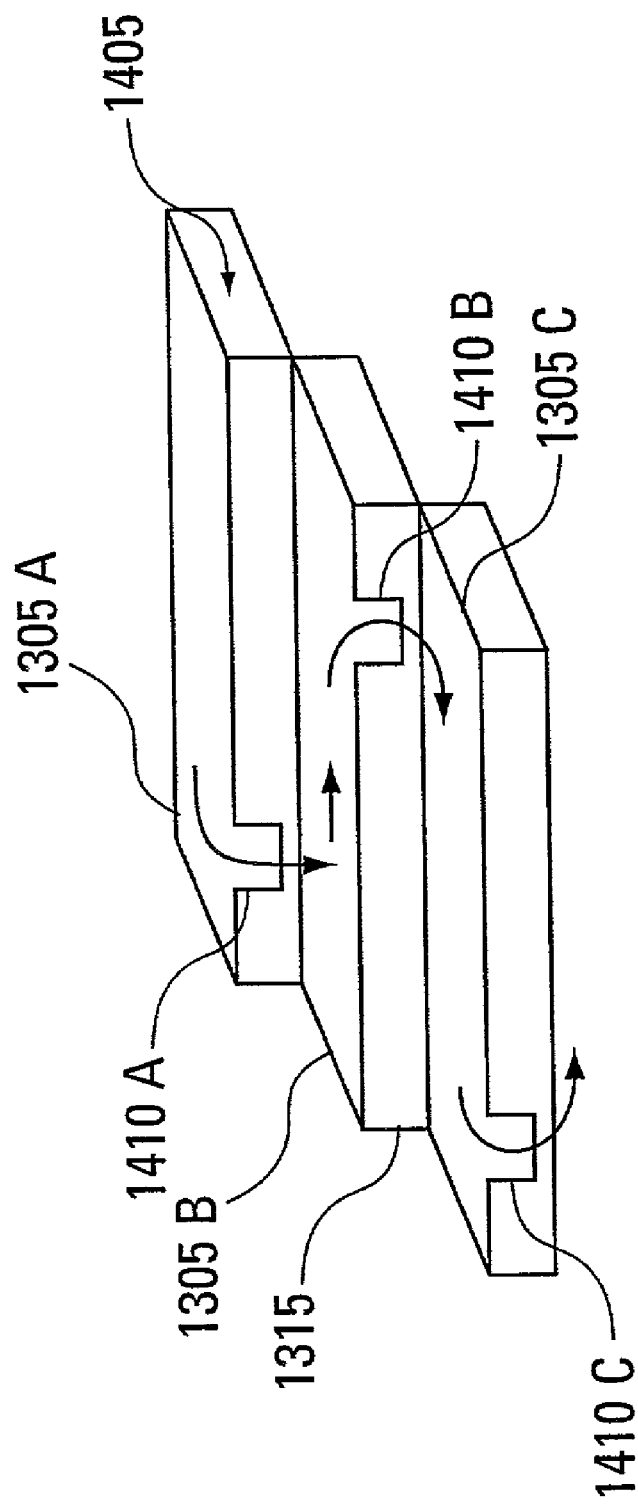
FIG. 14 is a perspective view of the fluid flow for the stair step multiple water retention area membrane shown in FIG. 13, according to one embodiment of the present invention.

Referring to FIG. 14, a perspective view of the fluid flow and fluid level setting notches for the stair step multiple liquid retention reservoir membrane shown in FIG. 13 is provided. Each of the separate liquid retention reservoirs 1305A–1305C includes a fluid level setting notch 1410A–1410C, respectively, that sets the fluid level in each of the respective liquid retention areas and creates the flow of the liquid from one reservoir to another. The curved arrows starting with 1405 show the fluid flow of the liquid, for example water, that is introduced into the solar distillation still. The fluid is first introduced into liquid retention area 1305A on the right side and flows to the fluid level setting notch 1410A. The excess liquid introduced into reservoir 1305A flows through level setting notch 1410A and enters the left side of reservoir 1305B, then flows to the right side of reservoir 1305B. Any excess liquid that enters reservoir 1305B will flow through level setting notch 1410B and enter the right side of reservoir 1305C. This liquid then flows right-to-left in reservoir 1305C. Any excess liquid in reservoir 1305C will flow through level setting notch 1410C and into an overflow area. The level setting notches 1410A–1410C may be set at different heights or at the same height so as to set the fluid levels in the respective reservoirs at different or the same depth. Optimal water level height for evaporation is to maintain a minimal level as is practical, never to exceed more than one inch and preferably only one quarter inch or less.

It is noteworthy that the dimensions of the still basin are in a preferred embodiment set to be just within the maximum allowed total volume for standard shipping charges for international shipping by a common carrier such as United Parcel Service (UPS) to ensure cost effective shipping of the solar distillation still to various locations throughout the world. As such, a shipping container, for example a cardboard box, have the maximum allowable volume is used to cover the still for shipping. In a preferred embodiment, still shipping weight with glass and legs included is 52 pounds and overall dimensions must total under 130 inches for all dimensions (L×W×H—as per UPS requirements) and on average the distiller boxed shipping dimensions are 50"×32"×7" (box is not perfectly square and is sloped).

Although particular embodiments of the present invention have been shown and described herein, it will be understood that it is not intended to limit the invention to the preferred embodiments and it will be obvious to those skilled in the art that various changes and modifications may be made without departing from the spirit and scope of the present invention. Thus, the invention is intended to cover alternatives, modifications, and equivalents, which may be included within the spirit and scope of the invention as defined by the claims. For example, in variations of the invention, material types used for the basin casing, membrane, legs, etc. may be used interchangeably (e.g., the membrane materials might be used for the basin casing and vice versa) and some embodiments might not include some components or parts (e.g., insulation layer or legs might be excluded).

All publications, patents, and patent applications cited herein are hereby incorporated by reference in their entirety for all purposes.

What is claimed is:

1. A solar powered distillation system, comprising:
   a solar powered distillation system including:
   an extruded, vacuum formed, molded or sprayed-on impermeable membrane comprised of a thermoplastic elastomer (TPE), a thermoplastic rubber (TPR), or an ethylene propylene terpolymer rubber (EPDM) and lining a basin for containment.

2. The solar powered distillation system of claim 1, wherein the extruded impermeable membrane is comprised of nonporous silicone (SLC), a thermoplastic vulcanizatione (TPV), or a fiberglass reinforced polyester (FRP).

3. The solar powered distillation system of claim 2, wherein the membrane material has an American National Standards Institute/National Sanitation Foundation (ANSI/NSF) Standard 61 rating approved for water contact.

4. The solar powered distillation system of claim 1, wherein the membrane material has an American National Standards Institute/National Sanitation Foundation (ANSI/NSF) Standard 61 rating approved for water contact.

5. The solar powered distillation system of claim 1, wherein the membrane is comprised of a Reinforced Plastic Sheet (FRP).

6. The solar powered distillation system of claim 5, wherein the membrane material has an American National Standards Institute/National Sanitation Foundation (ANSI/NSF) Standard 61 rating approved for water contact.

7. The solar powered distillation system of claim 1, wherein the basin includes a basin casing that is formed of an acrylonitrile butadyene styrene (ABS) plastic and the membrane covers the inside of the basin casing.

8. The solar powered distillation system of claim 7, wherein the basin casing includes a strengthening member on a bottom surface.

9. The solar powered distillation system of claim 8, wherein the strengthening member is integrally formed with the basing casing.

10. The solar powered distillation system of claim 9, further comprising:
a set of legs detachably connected to the basin and made of poly vinyl chloride (PVC) piping.

11. The solar powered distillation system of claim 10, wherein said PVC pipe is a schedule 40 or schedule 80 and is of a dark grey color.

12. A solar powered distillation system comprising:
a solar powered distillation system including:
a basin formed of a molded petroleum based material selected from the group of ABS plastic, polycarbonate, polypropylene, and polybutylene.

13. The solar powered distillation system of claim 12, wherein the basin includes a basin casing, and an insulation layer made of polyisocyanurate is molded or sprayed on an inside surface of the basin casing.

14. The solar powered distillation system of claim 13, further comprising:
an extruded, sprayed-on, or molded impermeable membrane lining said basin and having a plurality of stair stepped fluid reservoirs.

15. A solar powered distillation system comprising:
a solar powered distillation system including:
a basin casing having a bottom surface and a plurality of side surfaces that taper outward from a perpendicular direction from a normal plane of the bottom surface; and
a plurality of leg fittings formed integrally in the bottom surface.

16. The solar powered distillation system of claim 15, further comprising:
a plurality of legs made of PVC attached to the leg fittings; and
a plurality of angled fittings and straight PVC pipes connecting the plurality of legs together at an end of the plurality of legs not attached to the leg fittings.

17. A solar powered distillation system comprising:
a still casing with strengthening members integrally molded into a bottom surface of the still casing.

18. The solar powered distillation system of claim 17, wherein the still casing is made of ABS, a polycarbonate, polypropylene, or a polybutylene.

19. The solar powered distillation system of claim 18, further comprising:
an insulating layer molded or sprayed on an inner surface of the basin casing, wherein the insulating layer is made of polyisocyanurate or Styrofoam.

20. The solar powered distillation system of claim 19, further comprising:
a membrane made of a water grade nonporous silicone, Uniprene, Santoprene, Sarlink, or fiberglass reinforced polyester and attached at least to a lip surface connected to a plurality of vertical walls of the basin casing;
a transparent member placed in contact with a portion of the membrane attached to the lip surface so as to cover the still basin; and
a pressure strip that clamps the transparent member to the lip of the basin casing.

21. A solar powered distillation system, comprising:
a solar powered distillation system including:
a separately constructed basin constructed for approximately horizontal orientation; and
a stair stepped membrane lining the basin and having a plurality of fluid reservoirs.

22. A solar powered distillation system, comprising:
a solar powered distillation system including:
a separately constructed basin; and
an extruded, molded or sprayed-on impermeable membrane lining the basin of the solar powered distillation system, the membrane being for containment.

23. The solar powered distillation system of claim 22, wherein the impermeable membrane is nonporous and comprised of silicone.

24. The solar powered distillation system of claim 23, wherein the silicone is a food grade material and the food grade material is U.S. Food and Drug Administration (FDA) approved for use with food products.

25. The solar powered distillation system of claim 22, wherein the membrane is an extruded sheet that is cut, folded and adhesively attached to an inside surface of the basin so as to provide containment of a substance to be distilled.

26. The solar powered distillation system of claim 22, wherein the membrane is molded to a shape similar to the basin so as to line and form fit inside surfaces of the basin.

27. The solar powered distillation system of claim 22, wherein the membrane is sprayed-on material that adheres to and lines inside surfaces of the basin.

28. The solar powered distillation system of claim 23, wherein the silicone is an opaque or dark color.

29. The solar powered distillation system of claim 22, wherein the basin is formed of an aluminum sided insulation sheet including an outside aluminum layer and an inside insulation layer, the aluminum layer being sufficiently thick to provide structural rigidity and durability as an outside surface of the basin and the membrane covers the insulation layer inside the basin.

30. The solar powered distillation system of claim 29, wherein the aluminum layer is bonded to the insulation layer.

31. The solar powered distillation system of claim 30, further comprising:
adjustable legs attached to said basin, said adjustable legs for supporting and leveling the distillation system to optimize the solar powered distillation system efficiency.

32. The solar powered distillation system of claim 31, further comprising:
a carbon filter attached to an inlet or outlet of said solar power distillation system for removing various impurities.

33. A solar powered distillation system comprising:
a solar powered distillation system including:
a basin formed of an aluminum sided insulation, the aluminum being sufficiently thick to provide structural rigidity and durability to the basin of the solar power distillation system.

34. The solar powered distillation system of claim 33, wherein the aluminum sided insulation includes an insulation layer made of polyisocyanurate.

35. The solar powered distillation system of claim 34, wherein the aluminum is an aluminum layer that is bonded to the polyisocyanurate insulation layer to form an integral sheet with structural rigidity and strength.

36. The solar powered distillation system of claim 35, further comprising:
an extruded, sprayed-on, or molded impermeable membrane lining said basin.

37. The solar powered distillation system of claim 36, further comprising:
adjustable legs attached to said solar powered distillation system for supporting and horizontally leveling the distillation system so that when material to be distilled is placed in the distillation system it is equally distributed across a containment floor of the distillation system.

38. A solar powered distillation system, comprising:
a basin for containment of a substance to be distilled, the basin including:
an outer protective shell made of a structurally rigid and durable material; and
one or more layers of insulating material formed over and attached to an inner surface of the outer protective shell; and
an extruded, molded or sprayed-on impermeable membrane placed over and attached to the one or more layers of insulating material so as to form a lining inside the basin.

39. The solar powered distillation system of claim 38, wherein the membrane is an extruded sheet that is cut, folded and adhesively attached to the insulating material.

40. The solar powered distillation system of claim 38, wherein the membrane is molded to fit a shape of the basin and insulating material.

41. The solar powered distillation system of claim 38, wherein the molded membrane is comprised of silicone (SLC), a thermoplastic vulcanizatione (TPV), or a fiberglass reinforced polyester (FRP).

42. The solar powered distillation system of claim 38, wherein the membrane is comprised of a thermoplastic elastomer (TPE), a thermoplastic rubber (TPR), or an ethylene propylene terpolymer rubber with a diene monomer (EPDM).

43. The solar powered distillation system of claim 38, wherein the membrane is formed by spraying a liquid material that will transform into a solid impervious material over the insulating material.

44. The solar powered distillation system of claim 39, wherein the membrane is adhesively attached to the insulating material and sealed at corners of the basin with silicone.

* * * * *